May 1, 1928.

R. G. BACHELLER

GLASS HANDLING APPARATUS

Filed May 28, 1926

Inventor
R. G. Bacheller
by Robert A. Brown
Attorney.

Patented May 1, 1928.

1,667,714

UNITED STATES PATENT OFFICE.

RAYMOND G. BACHELLER, OF HARTFORD, CONNECTICUT, ASSIGNOR TO HARTFORD-EMPIRE COMPANY, OF HARTFORD, CONNECTICUT, A CORPORATION OF DELAWARE.

GLASS-HANDLING APPARATUS.

Application filed May 28, 1926. Serial No. 112,270.

My invention relates to apparatus that is particularly suitable for handling articles of glass, but which may be employed for also handling various other classes of articles and materials.

One object of my invention is to provide a simplified form of mechanism for automatically transferring glass articles from a glass-blowing machine or other source to a lehr.

Another object of my invention is to provide an apparatus by which glass ware may be placed in a lehr in definite relative positions and groups and in timed relation with respect to the movements of the blowing apparatus and the lehr.

Figure 1:
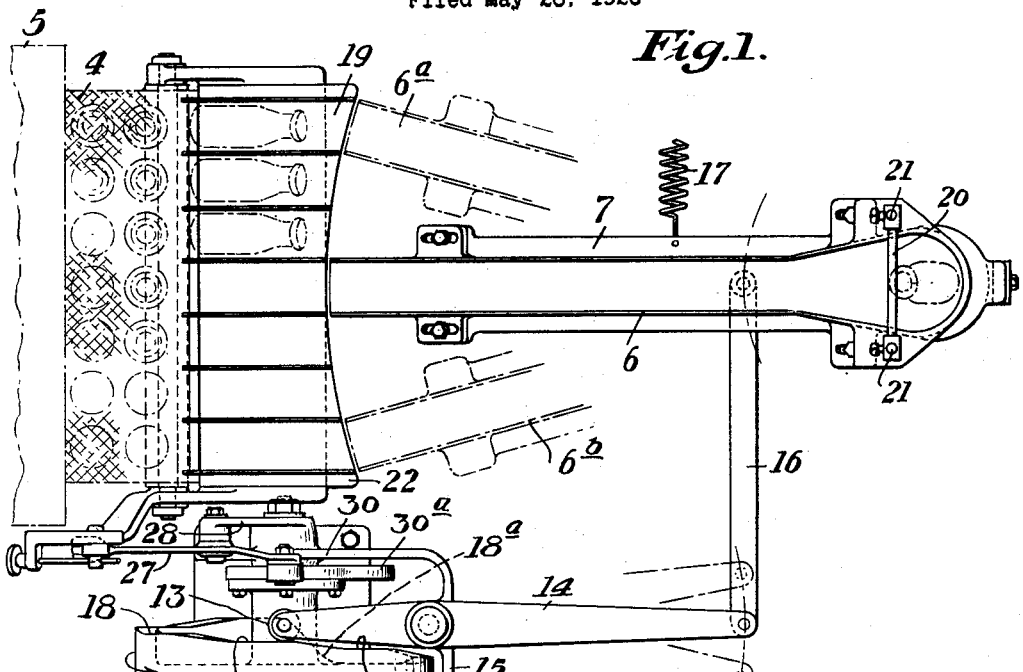
Figure 2:
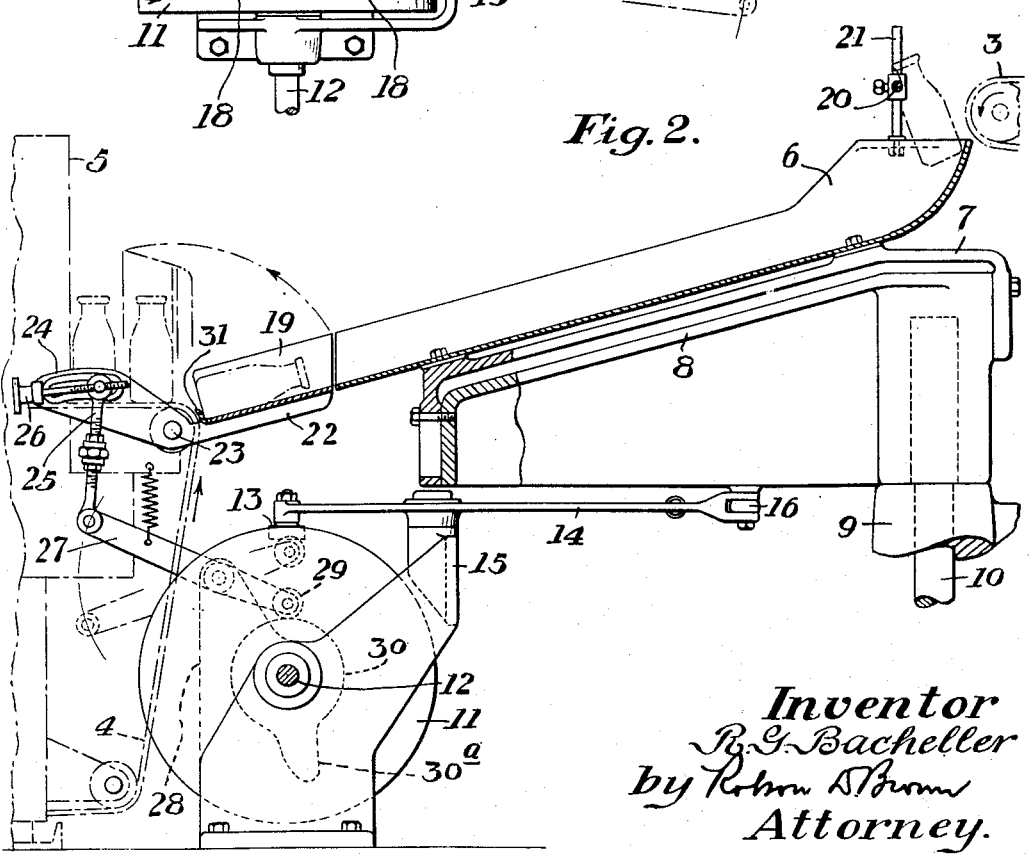

One form which my invention may take is shown in the accompanying drawing, wherein Fig 1 is a plan view of apparatus embodying my invention, and Fig. 2 is an elevational sectional view thereof.

The apparatus is shown as employed in conjunction with a conveyer or buck 3 (Fig. 2) that may deliver bottles from a glass-blowing machine, or any other source, and comprises means for transferring the bottles to a conveyer belt 4 that carries bottles into a lehr 5 for annealing.

The glass ware is delivered to the upper end of a chute 6 by the conveyer belt 3, by a suitably arranged takeout device, or manually. The chute 6 is mounted upon a bracket 7 which is bolted to a swinging frame 8 that is supported upon a base 9. A rod 10 projects from the base 9 and serves as a pivot for the frame 8. The frame 8 is oscillated about its pivot 10 by means of a cam 11, which is mounted upon a shaft 12 that is driven from any suitable source of power (not shown). The shaft 12 may be driven in timed relation to the movement of the bottle blowing machine (not shown), which delivers glass ware to the conveyer 3. The edge of the cam 11 is engaged by a roller 13 that is carried upon the outer end of a lever 14, which is pivotally supported upon a bracket arm 15. The inner end of the lever 14 is pivotally connected to one end of a link 16, the other end of which is pivotally connected to the swinging frame 8. When the lever 14 is moved in a clockwise direction by the cam 11, the carrier frame 8 will be swung against the tension of a spring 17, the spring 17 serving to maintain the roller 13 always in contact with the cam 11.

The cam is provided with a series of roller-engaging surfaces 18 located at different distances axially of the cam, so that the forward end of the chute 6 will be carried past a series of bottle receiving pockets 19. Each cam surface 18 extends in a substantially straight line for some distance, in order to provide a dwell in the travel of the forward end of the chute at each pocket 19, while the chute is being advanced in a clockwise direction, to allow time for a bottle to pass from the chute into a pocket before the chute moves toward the succeeding pocket.

As shown in Fig. 1, the lever 14 is being moved in a clockwise direction by the cam, and has delivered bottles to three of the pockets 19. After the highest point in the cam 11 has engaged the roller 13, the cam surface 18$^a$ permits the roller to move to the lowest point on the cam, and the spring 17 returns the chute to the position marked 6$^a$ whereupon it is again moved past the receiving pockets 19, to deliver another charge of bottles thereto.

A stop bar 20 is adjustably positioned upon rods 21 that are mounted upon the upper end of the chute. The bar engages the upper portions of the bottles as they are delivered to the chute and causes them to lie on their sides when sliding down the chute. The vertical adjustment of the bar 20 permits proper engagement thereby with ware of different sizes.

In order to remove the bottles from the pockets 19 when they have been delivered from the trough 6, I mount such pockets upon a tilting frame 22 that is pivotally mounted upon a shaft 23. The frame 22 has a slotted extending portion 24 within which the upper end of an adjustable link 25 is slidably mounted. The extension 24 also carries a thumb screw 26 that has screw-threaded engagement with the link 25 to adjustably position the same along the slot in the member 24 and thus regulate the degree of oscillation of the frame 22 when the link 25 is actuated.

The lower end of the link 25 is connected to a lever 27 that is pivotally connected to a bracket extension 28. The lower end of the lever 27 has a roller 29 that engages a cam 30, which is secured to the shaft 12.

The cams 11 and 30 have such relative adjustment circumferentially of the shaft 12, that the raised portion 30ª of cam 30 is brought into contact with the roller 29 to actuate the lever 27 and cause the tilting frame 22 to be tilted in a counter-clockwise direction, to the position indicated by dotted lines, Fig. 2, after the chute 6 has reached the position 6ᵇ, and before it commences another cycle of movement.

A lip 31 of asbestos or other suitable material is provided on the frame 22, to serve as a stop for the bottles as they are delivered into the pockets. The lip is of such form that it will permit the bottles to tilt upon and be carried away by the lehr conveyer 4 when the frame 22 is moved to upright position. It will be understood that the lehr conveyer 4 may be driven in any usual manner, in phase relation to movement of the other mechanism, to carry the bottles into the lehr 5.

It will thus be seen that the bottles are automatically delivered to the lehr in definite relative positions and in timed relation to movement of the conveyers 3 and 4.

I claim as my invention:

1. Apparatus for handling glassware, comprising an inclined chute pivotally supported adjacent to its upper end, a receiving rack extending transversely of the chute and mounted adjacent to the lower end thereof, and means for swinging the last named end of the chute longitudinally of said rack to deliver a series of articles thereto.

2. Transfer apparatus comprising an inclined slideway for delivering articles, a rack of greater width than the slideway, and having a plurality of article-receiving surfaces, means for oscillating the delivery end of the slideway to deposit articles on said surfaces, and means for periodically removing the articles from said rack.

3. Transfer apparatus comprising an inclined slideway for delivering articles, a rack of greater width than the slideway, and having a plurality of article-receiving surfaces, means for oscillating the delivery end of the slideway to deposit articles on said surfaces, and means for periodically tilting said rack to effect discharge of the articles deposited thereon.

4. Transfer apparatus comprising an inclined slideway for delivering articles, a rack of greater width than the slideway, and having a plurality of article-receiving surfaces, means for oscillating the delivery end of the slideway to deposit articles on said surfaces, and a common actuating means for moving the chute and the rack, to effect periodical charge and discharge of articles to and from the rack.

5. Transfer apparatus comprising a slideway having an article-receiving end and a discharge end, means for oscillating said discharge end in a generally horizontal direction, a setting-up device disposed adjacent to said discharge end, to receive articles from the slideway, and means for periodically shifting said setting-up device to carry the articles out of the line of discharge from the slideway.

6. Transfer apparatus comprising a slideway having an article-receiving end and a discharge end, means for oscillating said discharge end in a generally horizontal direction, a setting-up device disposed adjacent to said discharge end, to receive articles from the slideway, a carrier, and means for periodically moving said setting-up device to transfer the articles to said carrier.

7. Transfer apparatus comprising an inclined slideway for receiving articles at its upper end and delivering the same at its lower end, a vertical pivot for the upper end of the slideway, means for swinging the lower end of the slideway in a substantially horizontal direction, a receiving rack disposed adjacent to the path of movement of the slideway, and means for oscillating the rack about a horizontal axis to permit removal of the articles delivered thereto.

8. Transfer apparatus comprising an inclined slideway for receiving articles at its upper end and delivering the same at its lower end, a vertical pivot for the upper end of the slideway, means for swinging the lower end of the slideway in a substantially horizontal direction, a receiving rack disposed adjacent to the path of movement of the slideway, a carrier, a rack disposed between said carrier and slideway, in position to receive articles from the chute, and means for tilting the rack about a horizontal axis to effect delivery of the articles to the carrier.

9. Transfer apparatus comprising a delivery chute, a rack having a series of pockets normally lying in inclined position to receive articles from said chute, a drive shaft, a connection between said shaft and said chute for moving the chute past the pockets to deposit articles therein, and a second connection to said shaft for tilting said rack, to permit removal of the articles at the completion of each cycle of movement of the chute.

10. Transfer apparatus comprising a delivery chute, a rack having a series of pockets normally lying in inclined position to receive articles from said chute, a drive shaft, a connection between said shaft and said chute for moving the chute past the pockets to deposit articles therein, a second connection to said shaft for tilting said rack to permit removal of the articles at the completion of each cycle of movement of the chute, and a conveyer mounted in position to receive the articles from said rack.

Signed at Hartford, Conn. this 26th day of May, 1926.

RAYMOND G. BACHELLER.